(12) United States Patent
Stout et al.

(10) Patent No.: US 10,542,221 B2
(45) Date of Patent: Jan. 21, 2020

(54) LIGHT-BASED COMMUNICATION USING CAMERA FRAME-RATE BASED LIGHT MODULATION

(71) Applicants: Barry Stout, Beverly, MA (US); Bernhard Siessegger, Unterschleissheim (DE); Christian Breuer, Dortmund (DE); Yang Li, Georgetown, MA (US)

(72) Inventors: Barry Stout, Beverly, MA (US); Bernhard Siessegger, Unterschleissheim (DE); Christian Breuer, Dortmund (DE); Yang Li, Georgetown, MA (US)

(73) Assignee: OSRAMS SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/642,381

(22) Filed: Jul. 6, 2017

(65) Prior Publication Data

US 2019/0014250 A1    Jan. 10, 2019

(51) Int. Cl.
*H04N 5/235* (2006.01)
*H04N 5/225* (2006.01)
*H04N 5/378* (2011.01)
*H04N 5/353* (2011.01)

(52) U.S. Cl.
CPC ......... *H04N 5/2354* (2013.01); *H04N 5/2256* (2013.01); *H04N 5/2351* (2013.01); *H04N 5/378* (2013.01); *H04N 5/353* (2013.01)

(58) Field of Classification Search
None
See application file for complete search history.

(56) References Cited

U.S. PATENT DOCUMENTS

| | | | | |
|---|---|---|---|---|
| 2009/0273696 | A1* | 11/2009 | Krymski | H04N 5/3742 348/302 |
| 2010/0034540 | A1* | 2/2010 | Togashi | H04B 10/116 398/118 |
| 2011/0150285 | A1 | 6/2011 | Kimura | |
| 2012/0098436 | A1* | 4/2012 | Talstra | H04B 10/1149 315/132 |

(Continued)

FOREIGN PATENT DOCUMENTS

EP    2538584 A1    12/2012

OTHER PUBLICATIONS

Le, Thithanhnhan, et al., "Performance of Rolling Shutter and Global Shutter Camera in Optical Camera Communications," 2015 International Conference on Information and Communication Technology Convergence, Oct. 28, 2015, pp. 124-128.

(Continued)

*Primary Examiner* — David W Lambert
(74) *Attorney, Agent, or Firm* — Yutian Ling

(57) ABSTRACT

A method of Light-based Communication (LCom) using camera frame-rate based light modulation is provided. The method includes receiving light having modulated light properties that vary at a first frequency from a LCom-enabled luminaire by an image capture device using a global shutter image capture process, comparing light properties received at the image capture device over sequential image capture instances, and determining, from the compared light properties, data encoded by the modulated light.

19 Claims, 9 Drawing Sheets

(56) References Cited

U.S. PATENT DOCUMENTS

| | | | | |
|---|---|---|---|---|
| 2015/0098709 A1* | 4/2015 | Breuer | .................... | G01C 3/08 |
| | | | | 398/118 |
| 2015/0188658 A1* | 7/2015 | Rahn | ................... | H04J 14/0263 |
| | | | | 398/79 |
| 2016/0099773 A1* | 4/2016 | Raj | ...................... | H04B 10/116 |
| | | | | 398/118 |

OTHER PUBLICATIONS

Ganzmann, Anna, International Search Report and Written Opinion of the International Searching Authority, for counterpart application PCT/US2018/038681, dated Sep. 20, 2018, European Patent Office, Rijswijk, The Netherlands, 12 pages.

* cited by examiner

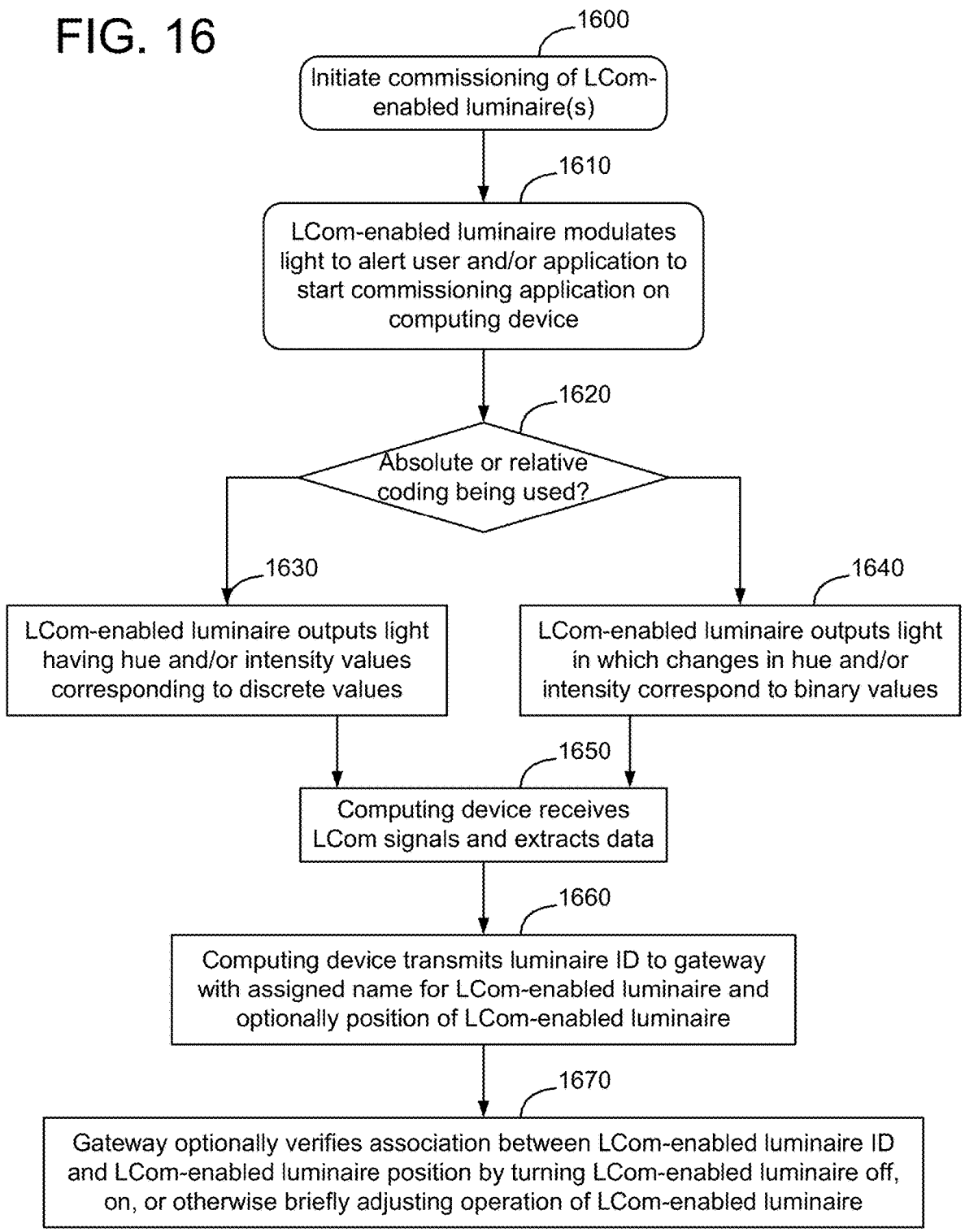

LIGHT-BASED COMMUNICATION USING CAMERA FRAME-RATE BASED LIGHT MODULATION

TECHNICAL FIELD

This present application relates to solid-state lighting fixtures and more particularly to Light-based Communication (LCom) using camera frame-rate based light modulation.

BACKGROUND

Programmable luminaires, such as those utilizing one or more solid-state light sources, may transmit data by modulating light output by the light source.

SUMMARY

All examples and features mentioned below may be combined in any technically possible way.

Various implementations described herein include a method of Light-based Communication (LCom) using camera frame-rate based light modulation. The method may include receiving, at a computing device from one or more LCom-enabled luminaires, modulated light having light properties that vary at a first frequency using a global shutter image capture process of an image capture device on the computing device, comparing, by the computing device, light properties received by the image capture device over sequential image capture instances, and determining, by the computing device, data encoded by the modulated light based on the compared light properties over the sequential image capture instances.

In some embodiments, the global shutter image capture process may include reading all pixels of an optical sensor of the image capture device during each sequential image capture instance. In some embodiments, the first frequency may be at most one half a second frequency at which the image capture device performs the global shutter image capture process. In some embodiments, the data encoded by the modulated light may include data encoded as absolute values of a light intensity level of the light and/or as absolute values of a light hue of the light. In some embodiments, the data encoded by the modulated light may include a first stream of data encoded as absolute values of the light hue of the light, and a second stream of data encoded as absolute values of the light intensity level of the light. In some embodiments, the data encoded by the modulated light may include data encoded as relative changes of a light intensity level of the light and/or as relative changes of a light hue of the light. In some embodiments, the data encoded by the modulated light may include a first stream of data encoded as relative changes of the light hue of the light, and a second stream of data encoded as relative changes of the light intensity level of the light. In some embodiments, the method may further include contacting the one or more LCom-enabled luminaires to initiate transmission of the modulated light by one of pushing a button on each of the one or more LCom-enabled luminaires, transmitting optical signals from the computing device to the one or more LCom-enabled luminaires, transmitting wireless control signals to the one or more LCom-enabled luminaires, the wireless control signals including one of Wi-Fi signals and Bluetooth signals, and turning on and off the power to the one or more LCom-enabled luminaires one or more times.

Further implementations described herein include a lighting device. The lighting device includes an image capture device configured to receive, from one or more LCom-enabled luminaires, modulated light having light properties that vary at a first frequency using a global shutter image capture process, and a processor coupled to the image capture device and configured to compare light properties received by the image capture device over sequential image capture instances, and determine data encoded by the modulated light based on the compared light properties over the sequential image capture instances.

In some embodiments, the global shutter image capture process may include reading all pixels of an optical sensor of the image capture device during each sequential image capture instance. In some embodiments, the first frequency may be at most one half a second frequency at which the image capture device performs the global shutter image capture process. In some embodiments, the data encoded by the modulated light may include data encoded as absolute values of a light intensity level of the light and/or as absolute values of a light hue of the light. In some embodiments, the data encoded by the modulated light may include a first stream of data encoded as absolute values of the light hue of the light, and a second stream of data encoded as absolute values of the light intensity level of the light. In some embodiments, the data encoded by the modulated light may include data encoded as relative changes of a light intensity level of the light and/or as relative changes of a light hue of the light. In some embodiments, the data encoded by the modulated light may include a first stream of data encoded as relative changes of the light hue of the light, and a second stream of data encoded as relative changes of the light intensity level of the light. In some embodiments, the processor may be further configured to contact the one or more LCom-enabled luminaires to initiate transmission of the modulated light by one of pushing a button on each of the one or more LCom-enabled luminaires, transmitting optical signals from the computing device to the one or more LCom-enabled luminaires, transmitting wireless control signals to the one or more LCom-enabled luminaires, the wireless control signals including one of Wi-Fi signals and Bluetooth signals, and turning on and off the power to the one or more LCom-enabled luminaires one or more times.

Further implementations described herein include a lighting system. The lighting system includes a LCom-enabled luminaire having a solid-state light source configured to encode data by emitting modulated light having light properties that vary at a first frequency. The lighting system further includes a computing device that includes an image capture device configured to receive, from the LCom-enabled luminaire, the modulated light using a global shutter image capture process, and a processor coupled to the image capture device and configured to compare light properties received by the image capture device over sequential image capture instances, and determine data encoded by the modulated light based on the compared light properties over the sequential image capture instances.

In some embodiments, the global shutter image capture process may include reading all pixels of an optical sensor of the image capture device during each sequential image capture instance. In some embodiments, the first frequency may be at most one half a second frequency at which the image capture device performs the global shutter image capture process. In some embodiments, the data encoded by the modulated light may include data encoded as at least one of absolute values of a light intensity level of the light, absolute values of a light hue of the light, relative changes of a light intensity level of the light, and relative changes of a light hue of the light.

BRIEF DESCRIPTION OF THE DRAWINGS

FIG. 16 illustrates a method of light-based communication in accordance with some embodiments of the present disclosure.

Figure 1:
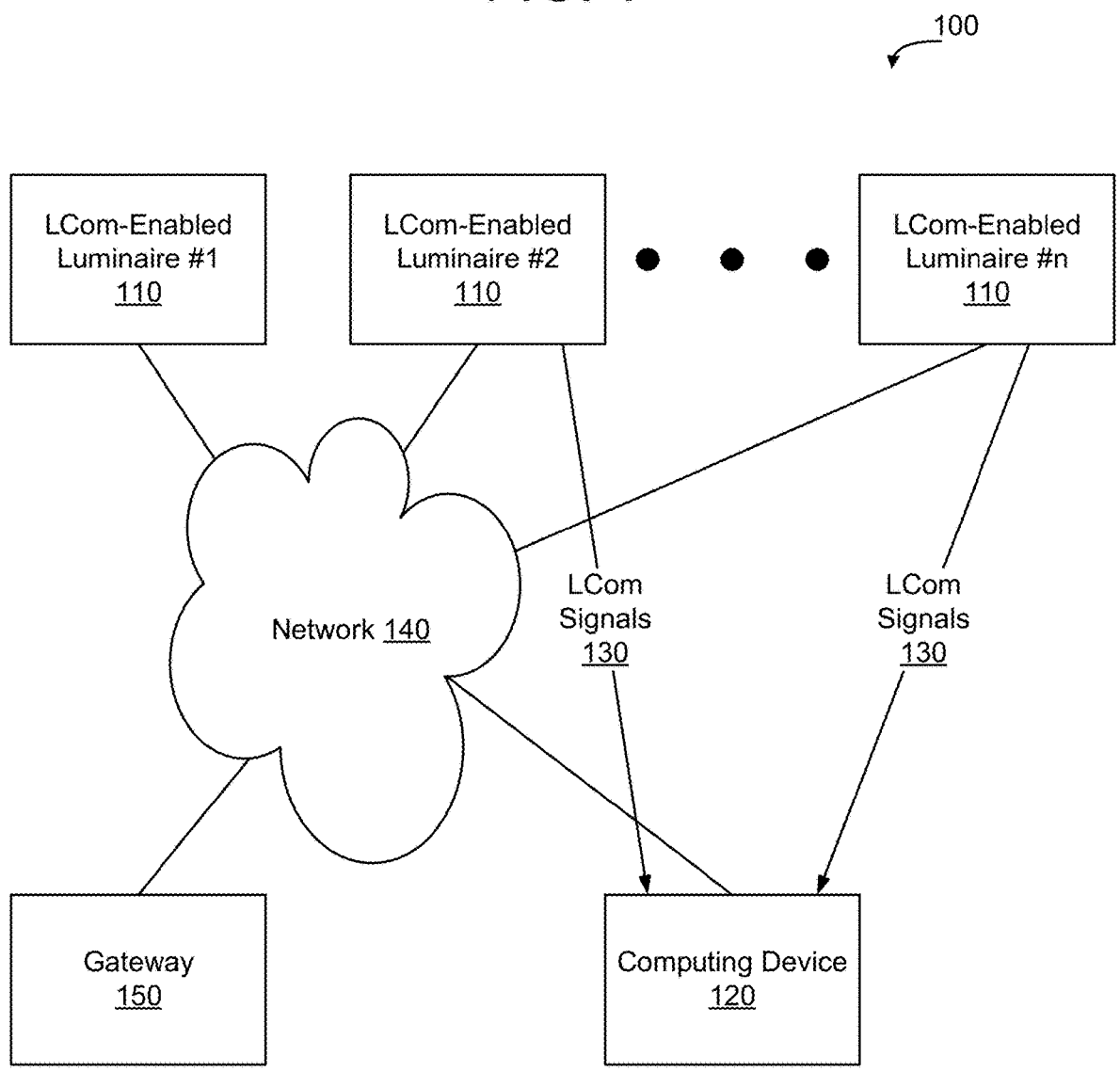
FIG. 1 is a block diagram illustrating an example light-based communication (LCom) system configured in accordance with some embodiments of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

This disclosure is based, at least in part, on the realization that it would be advantageous to provide Light-based Communication (LCom) using camera frame-rate based light modulation. Numerous configurations and variations will be apparent in light of this disclosure.

General Overview

In accordance with some embodiments of the present disclosure, techniques are disclosed for providing Light-based Communication (LCom) using low-frequency light modulation. As used herein, light-based communication (LCom) generally refers to communication between a solid-state luminaire and a receiver computing device, such as a smartphone or other computing device, using a modulated light signal that emanates from the luminaire and is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a modulated light signal encoded with data (an LCom signal), and a given receiver computing device, such as a smartphone or other computing device, may be configured to detect the modulated light signal encoded with data via one or more light-sensing devices, such as a camera and/or an ambient light sensor, among others.

Some embodiments relate to techniques for identifying LCom-enabled luminaires. In some embodiments, the techniques include a luminaire communicating its ID to a computing device (e.g., a smartphone or tablet) via one or more LCom signals. As a result, the computing device may determine exactly which luminaire to control. In some embodiments, a user may be able to aim a light sensor or image capture device (e.g., a rear-facing camera of a smartphone) at the luminaire desired to be controlled. Once the luminaire is in the field of view (FOV) of the light sensor, the ID of the luminaire may be determined using one or more LCom signals received from the luminaire.

As used herein, "light sensor" includes any device capable of detecting light or other electromagnetic energy, such as a photodetector, optical detector, image capture device, camera, LED(s) configured to act as a photodiode, charge-coupled device (CCD), active-pixel sensor (APS), or any other suitable device as will be apparent in light of the present disclosure. The ID of the luminaire may be, for example, its internet protocol (IP) address, media access control (MAC) address, Wi-Fi address, Bluetooth address, or some other suitable address or identifier, depending upon the communication protocol used by the luminaire or depending upon the given configuration or end-use. Once a luminaire has been identified (e.g., by decoding the ID of the luminaire via its LCom signals), commands may be issued to the luminaire to adjust one or more characteristics of the light output, such as changing the dimming percentage of the light output or changing the color of the light output, for example. This may be achieved by obtaining the ID via LCom and then using the ID to bootstrap or otherwise establish a second wireless communication connection (e.g., Bluetooth, Wi-Fi, or other suitable communication protocol by which the LCom-enabled luminaire may receive wireless communications) for transmitting the light control commands or a command to initiate commissioning. Note in some embodiments that bi-directional communication between the luminaire and the controlling device may also be carried out using an LCom-based protocol, assuming the LCom-enabled luminaire is configured with a light sensor and the ability to receive and process light-based communications, as provided herein.

As will be appreciated in light of this disclosure, techniques disclosed herein may be utilized in any of a wide range of LCom applications and contexts. For example, techniques disclosed herein may be utilized, in accordance with some embodiments, in transmitting location and positioning information between an LCom-enabled luminaire and a receiver computing device. This information may be utilized, in part or in whole, to control the] luminaire. In some embodiments, techniques disclosed herein may be utilized as the basis for identifying, establishing communication with, and/or controlling LCom-enabled luminaires. Numerous configurations and variations will be apparent in light of this disclosure.

System Architecture and Operation

FIG. 1 is a block diagram illustrating an example light-based communication (LCom) system 100 configured in accordance with some embodiments of the present disclosure. As may be seen, light-based communication (LCom) system 100 may include one or more LCom-enabled luminaires 110 configured for light-based communicative coupling with a computing device 120 via camera frame-rate based light modulation based LCom signal(s) 130. As discussed herein, such LCom signals 130 may be provided, in accordance with some embodiments, via visible light-based signals.

As will be apparent in light of the present disclosure, LCom signals, which generally include modulated light signals, may be used to encode or otherwise provide data which in turn may be used to help determine the identification and/or position of one or more LCom-enabled luminaires 110 transmitting or otherwise emitting the LCom signals. The data may include or indicate an LCom-enabled luminaire ID or address, a timing signal, and/or control parameters, for example. Therefore, LCom may be an inexpensive method for LCom-enabled luminaires 110 to communicate to external devices, particularly for solid-state lighting that already supports pulsing the light signal, thereby merely using software changes, for example.

In one implementation, LCom signals 130 received by computing device 120 are processed by computing device 120 to extract data transmitted by the LCom-enabled luminaires 110. The data, or information derived from the data, is communicated over network 140 to a gateway 150. Gateway 150 associates the information communicated by the LCom-enabled luminaire 110 with an LCom-enabled luminaire identifier (ID) at the gateway 150 to enable an association to be created between a physical location of the LCom-enabled luminaire 130 and the LCom-enabled luminaire ID. Subsequently, control signals identifying the LCom-enabled luminaire 110 by the LCom-enabled luminaire ID may be used to control the LCom-enabled luminaire 110 at the physical location via network 140.

For example, in one implementation the LCom-enabled luminaire 110 uses LCom signals 130 to transmit an LCom-enabled luminaire ID. The computing device 120 decodes the LCom signals 130 to extract the LCom-enabled luminaire ID. A user provides naming information for the LCom-enabled luminaire 110 and passes the naming information and LCom-enabled luminaire ID over network 140 to gateway 150. Subsequently, the computing device 120 may control LCom-enabled luminaire 110 by specifying control operations and the naming information to the gateway 150. In this manner the computing device 120 may specify control operations on LCom-enabled luminaires 110 using the naming information specified by the user rather than using the LCom-enabled luminaire ID.

Figure 2:
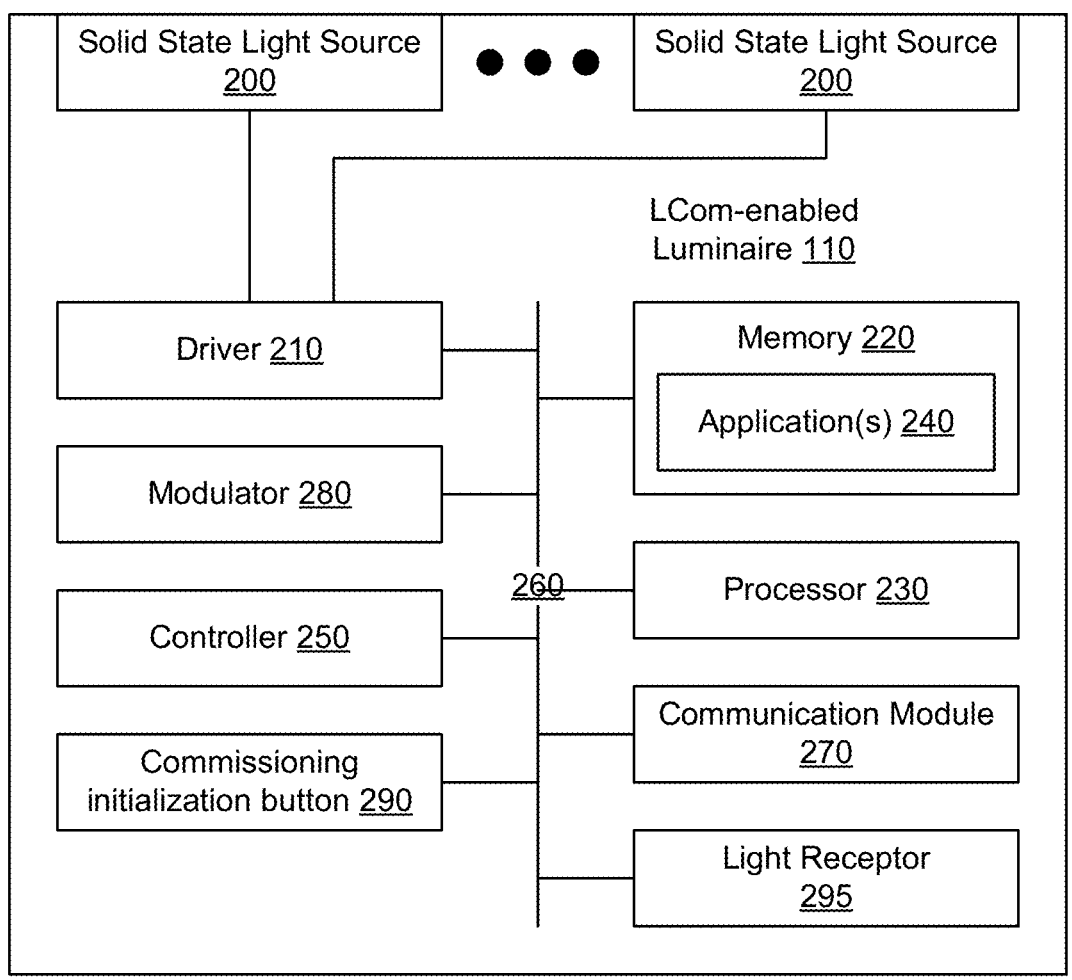
FIG. 2 is a block diagram illustrating an example LCom-enabled luminaire configured in accordance with some embodiments of the present disclosure.

FIG. 2 is a block diagram illustrating an LCom-enabled luminaire 110 configured in accordance with some embodiments of the present disclosure. As may be seen, a given LCom-enabled luminaire 110 may include one or more solid-state light sources 200, in accordance with some embodiments. The quantity, density, and arrangement of solid-state light sources 200 utilized in a given LCom-enabled luminaire 110 may be customized, as desired for a given target application or end-use.

A given solid-state light source 200 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use.

In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some embodiments, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof.

In some embodiments, a given solid-state emitter may be configured as a high-brightness semiconductor light source. In some embodiments, a given solid-state emitter may be provided with a combination of any one or more of the aforementioned example emissions capabilities.

In accordance with some embodiments, the one or more solid-state light sources 200 of a given LCom-enabled luminaire 110 may be electronically coupled with a driver 210. In some embodiments, driver 210 may be an electronic driver (e.g., single-channel; multi-channel) configured, for example, for use in controlling one or more solid-state emitters of a given solid-state light source 200. For instance, in some embodiments, driver 210 may be configured to control the on/off state, dimming level, color of emissions, correlated color temperature (CCT), and/or color saturation of a given solid-state emitter (or grouping of emitters). To such ends, driver 210 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 210 to adjust AC voltage to driver 210); and/or (8) a combination of any one or more thereof. Other suitable configurations for driver 210 and lighting control/driving techniques will depend on a given application and will be apparent in light of this disclosure.

As will be appreciated in light of this disclosure, a given solid-state light source 200 also may include or otherwise be operatively coupled with other circuitry/componentry, which may be used in solid-state lighting. For instance, a given solid-state light source 200 (and/or LCom-enabled luminaire 110) may be configured to include or otherwise be operatively coupled with any of a wide range of electronic components, such as: (1) power conversion circuitry (e.g., electrical ballast circuitry to convert an AC signal into a DC signal at a desired current and voltage to power a given solid-state light source 200); (2) constant current/voltage driver componentry; (3) transmitter and/or receiver (e.g., transceiver) componentry; and/or (4) local processing componentry. When included, such componentry may be mounted, for example, on one or more driver boards, in accordance with some embodiments.

As may be seen from FIG. 2, a given LCom-enabled luminaire 110 may include memory 220 and one or more processors 230. Memory 220 may be any form of non-transitory tangible computer-readable storage medium, of any suitable type (e.g., RAM and/or ROM, or other suitable memory) and size, and in some embodiments may be implemented with volatile memory, non-volatile memory, or a combination thereof. A given processor 230 may be configured as typically done, and in some embodiments may be configured, for example, to perform operations associated with a given LCom-enabled luminaire 110 and one or more of the components thereof (e.g., within memory 220 or elsewhere). In some embodiments, memory 220 may be configured to be utilized, for example, for processor workspace (e.g., for one or more processors 230) and/or to store media, programs, applications 240, and/or content on the LCom-enabled luminaire 110 on a temporary or permanent basis.

The one or more applications 240 stored in memory 220 may be accessed and executed, for example, by the one or more processors 230 of a given LCom-enabled luminaire 110. In accordance with some embodiments, a given application 240 may be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The application 240 may be encoded, for example, on a machine-readable medium that, when executed by a processor 230, carries out the functionality of a given LCom-enabled luminaire 110, in part or in whole. The computer-readable medium may be, for example, a hard drive, a compact disk, a memory stick, a server, or any suitable non-transitory computer/computing device memory that includes executable instructions, or a plurality or combination of such memories. Other embodiments may be implemented, for instance, with gate-level logic or an application-specific integrated circuit (ASIC) or chip set or other such purpose-built logic. Some embodiments may be implemented with a microcontroller having input/output capability (e.g., inputs for receiving user inputs; outputs for directing other components) and a number of embedded routines for carrying out the device functionality. In a more general sense, the functional components in memory 220 (e.g., one or more applications 240, discussed below) may be implemented in hardware, software, and/or firmware, as desired for a given target application or end-use.

In accordance with some embodiments, a given LCom-enabled luminaire 110 may be configured to receive input, for example, via one or more applications 240 stored in memory 220 (e.g., such as a lighting pattern, LCom data, etc.). Other suitable components, applications, and data which may be stored in memory 220 (or may be otherwise accessible to a given LCom-enabled luminaire 110) will depend on a given application and will be apparent in light of this disclosure.

In accordance with some embodiments, the one or more solid-state light sources 200 of a given LCom-enabled luminaire 110 may be electronically controlled, for example, to output light and/or light encoded with LCom data (e.g., the LCom signal 130). To that end, a given LCom-enabled luminaire 110 may include or otherwise be communicatively coupled with one or more controllers 250, in accordance with some embodiments. In some embodiments, such as that illustrated in FIG. 2, a controller 250 may be incorporated by a given LCom-enabled luminaire 110 and operatively coupled (e.g., via a communication bus/interconnect 260) with the one or more solid-state light sources 200 of that LCom-enabled luminaire 110. In this example embodiment, controller 250 may output a digital control signal to any one or more of the solid-state light sources 200. Controller 250 may output digital control signals based on wired and/or wireless input received from a given local source, such as processor 230, or from input received from a remote source via communication module 270. As a result, a given LCom-enabled luminaire 110 may be controlled in such a manner as to output any number of output beams, which may include light and/or LCom data (e.g., an LCom signal), as desired for a given target application or end-use.

Although FIG. 2 shows controller 250 as being implemented separate from solid-state light sources 200, in other implementations each solid-state light source 200 may have its own controller 250 operatively coupled therein.

In accordance with some embodiments, a given controller 250 may include one or more lighting control units and may be programmed or otherwise configured to output one or more control signals, for example, to adjust the operation of the solid-state emitter(s) of a given solid-state light source 200. For example, in some embodiments, a given controller 250 may be configured to output a control signal to control whether the light beam of a given solid-state emitter is on/off. In some instances, a given controller 250 may be configured to output a control signal to control the intensity/brightness (e.g., dimming; brightening) of the light emitted by a given solid-state emitter. In some embodiments, a given controller 250 may be configured to output a control signal to control the color (e.g., mixing; tuning) of the light emitted by a given solid-state emitter.

Thus, if a given solid-state light source 200 includes two or more solid-state emitters configured to emit light having different wavelengths, the control signal from the controller 250 may be used to adjust the relative brightness of the different solid-state emitters in order to change the mixed color output by that solid-state light source 200. In some embodiments, controller 250 may be configured to output a control signal to facilitate encoding of LCom data for transmission by a given LCom-enabled luminaire 110. In some embodiments, controller 250 may be configured to output a control signal to modulator 280 (discussed below) to facilitate modulation of an LCom signal 230 for transmission by a given LCom-enabled luminaire 110. Other suitable configurations and control signal output for a given controller 250 of a given LCom-enabled luminaire 110 will depend on a given application and will be apparent in light of this disclosure.

In accordance with some embodiments, the controller 250 of a given LCom-enabled luminaire 100 may be configured to encode LCom data in preparation for transmission thereof by the LCom-enabled luminaire 110. To that end, controller 250 may be provided with any suitable configuration, as will be apparent in light of this disclosure.

In accordance with some embodiments, a given LCom-enabled luminaire 110 may include a modulator 280. In some embodiments, modulator 280 may be configured, for example, to modulate an LCom signal 230 in preparation for transmission thereof by the LCom-enabled luminaire 110. In some embodiments, the driver 210 and the modulator 280 may be combined into a single unit. For example, the modulator 280 may be a single-channel or multi-channel electronic driver configured, for example, for use in controlling the output of the one or more solid-state emitters of a given solid-state light source 200.

In some embodiments, modulator 280 may be configured to control the on/off state, dimming level, color of emissions, correlated color temperature (CCT), and/or color saturation of a given solid-state emitter (or grouping of emitters). To such ends, modulator 280 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 280 to adjust AC voltage to modulator 280); and/or (8) any other suitable lighting control/driving technique, as will be apparent in light of this disclosure. Other suitable configurations and control/driving techniques for modulator 280 will depend on a given application and will be apparent in light of this disclosure.

In some embodiments, the LCom-enabled luminaire 110 may include a commissioning initialization button 290. A user may press the a commissioning initialization button 290 to initiate commissioning of the LCom-enabled luminaire 110 before the light-based communication between the LCom-enabled luminaire and the computing device may begin. In some embodiments the LCom-enabled luminaire 110 includes one or more light receptors 295 to receive light transmitted by computing device 120. Inclusion of light receptors 295 enables the LCom-enabled luminaire to receive light-based communication from computing device 120 or another device having a controllable light source.

Figure 3:
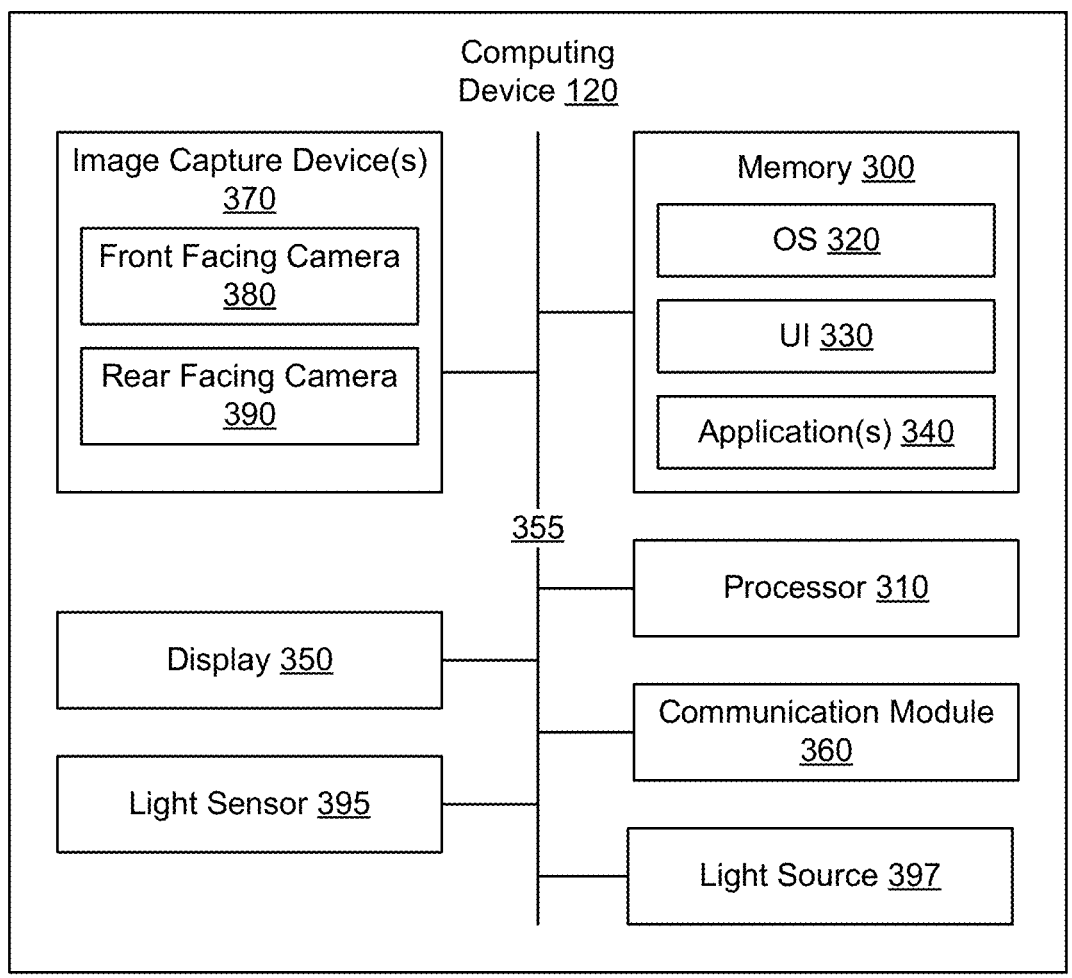
FIG. 3 is a block diagram illustrating an example computing device configured in accordance with some embodiments of the present disclosure.

FIG. 3 illustrates an example computing device 120 configured in accordance with some embodiments of the present disclosure. As discussed herein, computing device 120 may be configured, in accordance with some embodiments: (1) to detect light-based communication using camera frame-rate based light modulation signals emitted by a transmitting LCom-enabled luminaire 110; and (2) to decode the LCom data from a detected LCom signal. To these ends, computing device 120 may be any of a wide range of computing platforms, mobile or otherwise. For example, in accordance with some embodiments, computing device 120 may be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 120 will depend on a given application and will be apparent in light of this disclosure.

As may be seen from FIG. 3, computing device 120 may include memory 300 and one or more processors 310. Memory 300, processors 310, and other components of computing device 120 may be interconnected by communication bus/interconnect 355. Memory 300 may be of any suitable type (e.g., RAM and/or ROM, or other suitable memory) and size, and in some embodiments may be implemented with volatile memory, non-volatile memory, or a combination thereof. A given processor 310 of computing device 120 may be configured as typically done, and in some embodiments may be configured, for example, to perform operations associated with computing device 120 and one or more of the modules thereof (e.g., within memory 300 or elsewhere). In some embodiments, memory 300 may be configured to be utilized, for example, for processor workspace (e.g., for one or more processors 310) and/or to store media, programs, applications, and/or content on computing device 120 on a temporary or permanent basis.

The one or more components stored in memory 300 may be accessed and executed, for example, by the one or more processors 310 of computing device 120. In accordance with some embodiments, a given component in memory 300 may be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure.

The components in memory 300 may be encoded, for example, on a machine-readable medium that, when executed by a processor 310, carries out the functionality of computing device 120, in part or in whole. The computer-readable medium may be, for example, a hard drive, a compact disk, a memory stick, or any suitable non-transitory computer/computing device memory that includes executable instructions, or a plurality or combination of such memories. Other embodiments may be implemented, for instance, with gate-level logic or an application-specific integrated circuit (ASIC) or chip set or other such purpose-built logic. Some embodiments may be implemented with a microcontroller having input/output capability (e.g., inputs for receiving user inputs; outputs for directing other components) and a number of embedded routines for carrying out the device functionality. In a more general sense, the functional components in memory 300, such as Operating System (OS) 320, User Interface (UI) 330, and/or one or more applications 340, may be implemented in hardware, software, and/or firmware, as desired for a given target application or end-use.

In accordance with some embodiments, memory 300 may include an Operating System (OS) 320. OS 320 may be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 320 may be configured, for example, to aid in processing LCom data during its flow through computing device 120. Other suitable configurations and capabilities for OS 320 will depend on a given application and will be apparent in light of this disclosure.

In accordance with some embodiments, computing device 120 may include a User Interface (UI) module 330. UI 330 may be configured, in accordance with some embodiments, to present a graphical UI (GUI) on display 350 that is configured, for example, to aid in carrying out any of the various LCom-related techniques discussed herein. Other suitable configurations and capabilities for UI 330 will depend on a given application and will be apparent in light of this disclosure.

In accordance with some embodiments, memory 300 may have stored therein (or otherwise have access to) one or more applications 340. In some instances, computing device 120 may be configured to receive input, for example, via one or more applications 340 stored in memory 300. For example, memory 300 may include an LCom-enabled luminaire control application. Other suitable components, applications, and data which may be stored in memory 300 (or may be otherwise accessible to computing device 120) will depend on a given implementation and will be apparent in light of this disclosure.

As may be seen further from FIG. 3, computing device 120 may include a display 350, in accordance with some embodiments. Display 350 may be any electronic visual display or other device configured to display or otherwise generate an image (e.g., image, video, text, and/or other displayable content) thereat. In some instances, display 350 may be integrated, in part or in whole, with computing device 120, whereas in some other instances, display 350 may be a stand-alone component configured to communicate with computing device 120 using any suitable wired and/or wireless communications process. In some embodiments, display 350 optionally may be a touchscreen display or other touch-sensitive display.

In some implementations computing device 120 includes communication module 360 to communicate via network 140. In some embodiments, computing device 120 may be configured to exchange data with the gateway 150 over the network 140. For example, computing device 120 may receive data from the gateway 150 such as position, ID, and/or other data pertaining to a given LCom-enabled luminaire 110. Computing device 120 may also transmit data to the gateway 150, such as LCom data received by computing device 200 from a given LCom-enabled luminaire 110. Computing device 120 may also communicate control information for a given LCom-enabled luminaire 110 to the gateway 150 and instruct the gateway 150 to execute particular light control operations on LCom-enabled luminaire 110.

As shown in FIG. 3, computing device 120 includes one or more image capture devices 370. Image capture devices 370 may include a front facing camera 380, rear facing camera 390, or other image capture device. According to various implementations, at least one image capture device 370 operates using a global shutter image capture process. Digital image capture devices, such as CCD and CMOS sensors, operate to capture an image either using a rolling shutter or a global shutter approach. In a rolling shutter image capture device, the sensor captures an image by scanning the image sequentially, line by line. A rolling shutter image capture device reads individual lines of pixels, typically starting at a top of the sensor and continuing to read subsequent lines of pixels until reading the last row of pixels at the bottom of the sensor, and then repeats the process. In a global shutter approach, by contrast, the image capture device 370 scans the entire area of the image to read all pixels of the sensor at a given point in time instead of reading separate lines of pixels.

In some implementations, the computing device 120 includes a light sensor 395. The light sensor may be used to detect ambient light level as well as to detect light output from the LCom-enabled luminaire 110. In some implementations light transmitted by the LCom-enabled luminaire 110 is detected by the light sensor 395 to help synchronize timing between the LCom-enabled luminaire 110 and the computing device 120.

In some implementations, the computing device 120 includes a light source 397 to output light signals to the LCom-enabled luminaire 110. The light source may be, for example, a flash associated with the front facing camera 380, a flash associated with the rear facing camera 390, or another light source. Pulsing light output from the light source 397 is used, in some embodiments, to send synchronization commands to light receptor(s) 295 on the LCom-enabled luminaire 110 to synchronize the LCom-enabled luminaire 110 with the computing device 120. In some implementations synchronization between the LCom-enabled luminaire 110 and the computing device 120 enables the computing device to specify the frequency of the global image capture process as well as to specify the timing of the global image capture process at the computing device 120.

Figure 4:
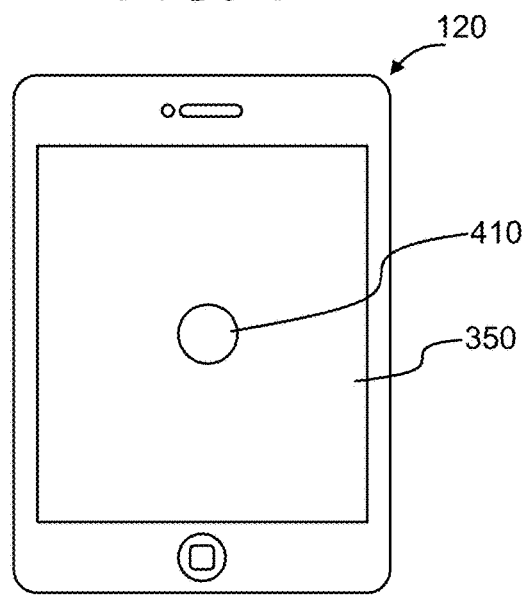
FIG. 4 illustrates a graphical user interface of an example computing device displaying modulated light from a single LCom-enabled luminaire in accordance with some embodiments of the present disclosure.

In implementations in which computing device 120 is a smartphone, typical image capture rates for smartphone cameras are between 30 and 240 frames per second. FIG. 4 shows an example computing device 120 implemented as a smartphone having a display 350. An image capture device 370 on the computing device 120 is aimed at an LCom-enabled luminaire that is transmitting LCom signals 130 that are captured by the image capture device 370 and appear on the display 350. In the example shown in FIG. 4 an image 410 of a single LCom-enabled luminaire is captured by image capture device 370 and shown on display 350.

Figure 5:
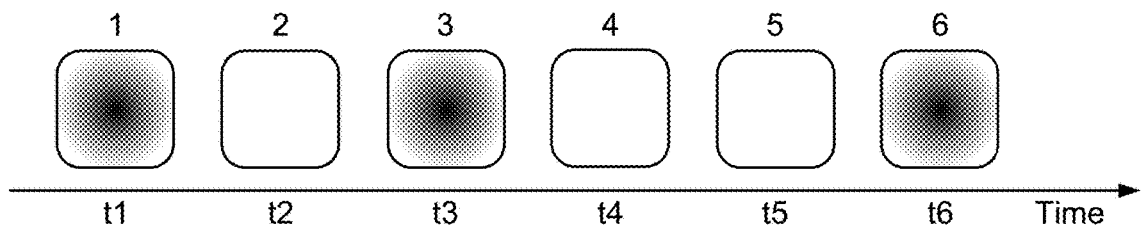
FIG. 5 illustrates received modulated light encoding data from an LCom-enabled luminaire by a camera using a global shutter image capture process in accordance with some embodiments of the present disclosure.

FIG. 5 shows an example sequence of images captured by the image capture device 370 of computing device 120 when image capture device 370 is operating in global shutter mode of operation. Specifically, in the example shown in FIG. 5, an image capture device 370, operating in global shutter mode, captures light levels on all pixels across the entire frame of the image capture device 370. Each of the squares represents an image captured by an image capture device 370 at a given point in time and, hence, the sequence of images represents an example sequence of sequential images captured by the image capture device 370. To enable the LCom-enabled luminaire 110 to transmit LCom data 130, the LCom-enabled luminaire modulates light output at a rate to enable it to be captured by the image capture device 370. To enable light signals to be unambiguously detected, the LCom data signal 130 alternates light levels at half the image capture rate (at most) of the image capture device 370. For example, if the image capture device is designed to capture data at 30 frames per second, the LCom data signal 130 encodes data at a frequency no greater than 15 hertz.

Figure 6:
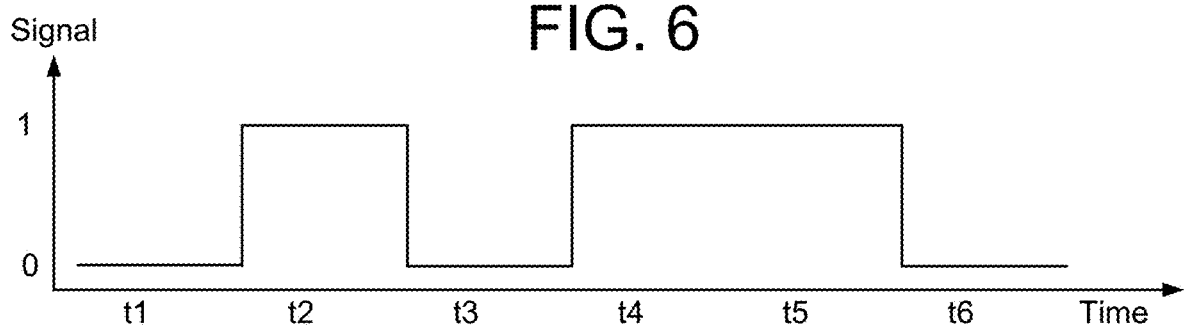
FIG. 6 is a graph showing data determined from the modulated light from the single LCom-enabled luminaire in accordance with some embodiments of the present disclosure.

FIG. 5 shows a sequence of images detected by an example LCom-enabled luminaire 110. FIG. 6 shows a correlated data signal obtained from the sequence of detected images. As shown in FIG. 5, by causing the LCom-enabled luminaire 110 to transmit light using camera frame-rate based light modulation, images captured by the image captured device 370 at subsequent global shutter read events reflect different light levels over time in regions of the field of view. In the time dependent sequence of images shown in FIG. 5, images at times t1, t3, and t6 have light levels relatively lower than images at times t2, t4, and t5. As shown in FIG. 6, the computing device 120 processes each image to determine the quality of light captured in the image, and from the quality of light determines whether the LCom signal is a binary "0" or binary "1". In the example shown in FIG. 6, the signal detected from the time dependent sequence of images shown in FIG. 5 corresponds to "010110".

Because the image capture device 370 is operating in global shutter image capture mode, the image capture device 370 may not detect changes in light levels between frame capture events. Specifically, since the image capture device 370 detects light at discrete intervals, intervening changes in light levels are not captured by the image capture device 370. Thus, if the image capture device 370 is reading the output of the light sensors at 30 frames per second, the image capture device 370 is not able to capture light fluctuations occurring at higher frequencies. Rather, each image generated by the image capture device 370 contains light detected during the interval since the previous image read operation.

Figure 7:
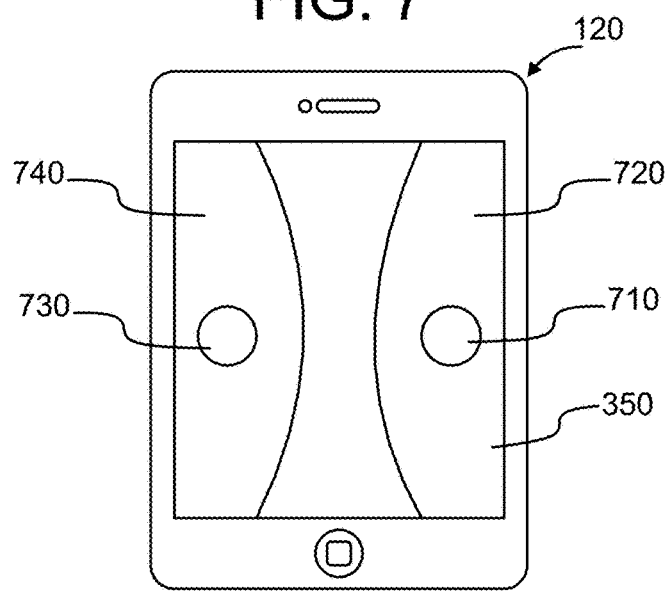
FIG. 7 illustrates a graphical user interface of an example computing device displaying modulated light from multiple LCom-enabled luminaires in accordance with some embodiments of the present disclosure.
Figure 8:
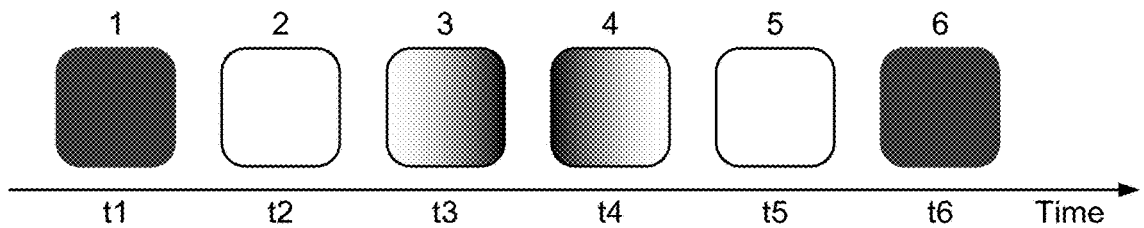
FIG. 8 illustrates received modulated light encoding data from multiple LCom-enabled luminaires by a camera using a global shutter image capture process in accordance with some embodiments of the present disclosure.
Figure 9:
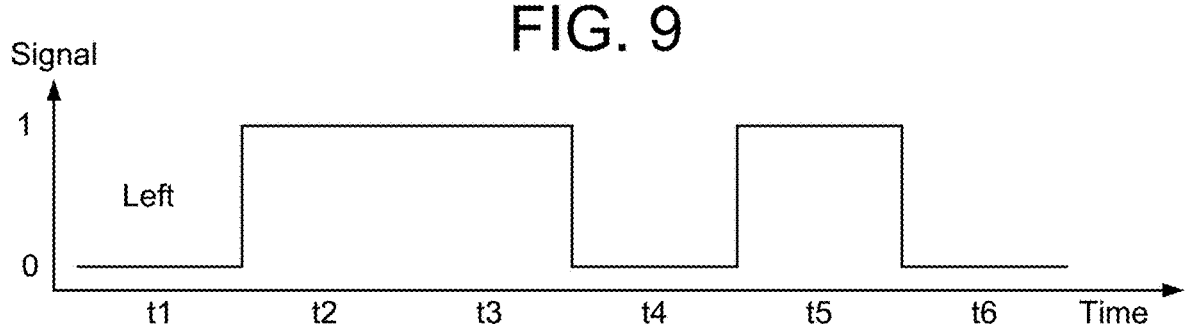
FIG. 9 is a graph showing data determined from the modulated light from the multiple LCom-enabled luminaires in accordance with some embodiments of the present disclosure.
Figure 9:
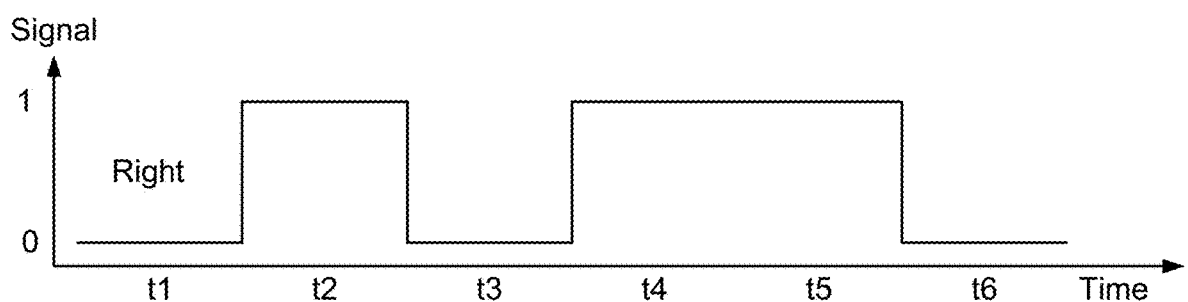

However, although the image capture device 370 is not able to increase resolution to detect light variations between frames, it does retain spatial information within each frame. Accordingly, as shown in FIGS. 7-9, the image capture device in some implementations may be able to read LCom signals 130 from multiple LCom-enabled luminaires at the same time. For example, in FIG. 7 shows an example computing device 120 implemented as a smartphone having a display 350. An image capture device 370 on the computing device has a field of view that encompasses two LCom-enabled luminaires 110 that are transmitting LCom signals 130. The images of the two LCom-enabled luminaires 110 that are captured by the image capture device 370 appear on the display 350. In the example shown in FIG. 7, two images 710, 730 of the two LCom-enabled luminaires 110 are shown on display 350. The first image 710 appears on the right side 720 of the display and the second image 730 appears on the left side 740 of the display in this example. More than two luminaires may be within the field of view of the image capture device 370 and likewise the relative position of the multiple luminaires may appear anywhere within the field of view of the image capture device 370.

FIG. 8 shows a sequence of images captured by image capture device 370 over time. At time t1 both LCom-enabled luminaires are outputting relatively lower light levels. At time t2, both LCom-enabled luminaires are outputting relatively higher light levels. At time t3 LCom-enabled luminaire 730 on the left side of display 740 is outputting a relatively higher light level and LCom-enabled luminaire 710 on the right side of display 720 is outputting a relatively lower light level. At time t4 LCom-enabled luminaire 730 on the left side of display 740 is outputting a relatively lower light level and LCom-enabled luminaire 710 on the right side of display 720 is outputting a relatively higher light level. At time t5, both LCom-enabled luminaires are outputting relatively higher light levels. At time t6 both LCom-enabled luminaires are outputting relatively lower light levels.

By individually determining light level averages of the left side of display 740 and right side of display 720, the computing device 120 is able to distinguish LCom signals 130 output by LCom-enabled luminaire 730 from LCom signals 130 output by LCom-enabled luminaire 710. Specifically, as shown in FIG. 9, the computing device 120 detects relatively lower light levels on the left side of display 740 as corresponding to LCom signals from LCom-enabled luminaire 730. As shown in FIG. 9, the computing device 120 processes each image to determine the quality of light captured in the image, and from the quality of light determines whether the LCom signals are encoding binary "0" or binary "1". For example in FIG. 9 the signal detected from LCom-enabled luminaire 720 on the left side of the display 740 corresponds to "011010". Likewise, in FIG. 9, the signal detected from LCom-enabled luminaire 710 on the right side of the display 720 corresponds to "010110".

As noted above, to ensure that the image capture device is able to discern LCom signals 130, per Nyquist theory the frequency of the LCom signals is no greater than one half the frame capture rate of the image capture device 370. If the image capture device 370 is capturing frames on the order of 30 frames per second, this means the frequency of the LCom signals 130 is no greater than 15 hertz. As used herein, the phrase "camera frame-rate based light modulation" refers to modulation of light properties by an LCom-enabled luminaire at a first frequency that is at most one half a second frequency at which a corresponding image capture device 370 performs a global shutter image capture operation.

Figure 12:
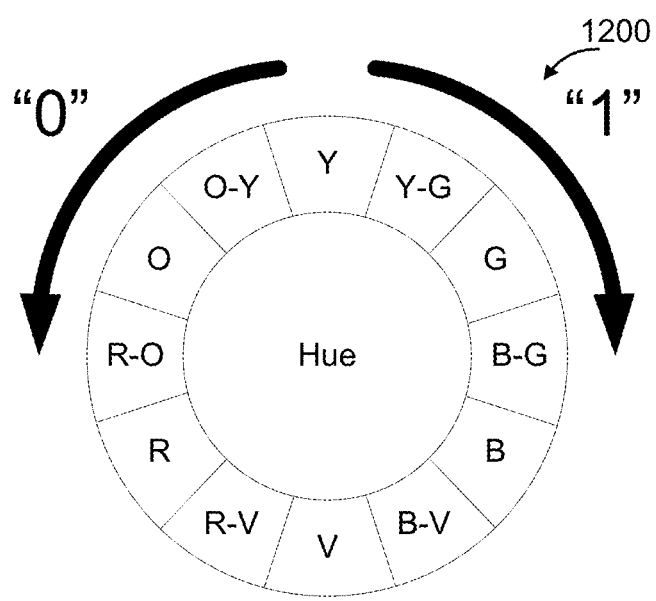
FIGS. 12-13 illustrate example relative hue processes for encoding data onto a light-based communication signal by an LCom-enabled luminaire in accordance with some embodiments of the present disclosure.
Figure 13:
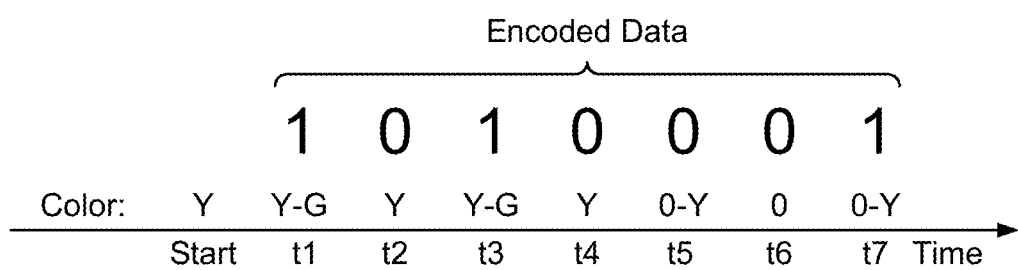

In some implementations the light output by the LCom-enabled luminaire 110 is turned on/off while outputting LCom signals 130. In other implementations, as shown in FIGS. 12 and 13, the quality of the light output by the LCom-enabled luminaire 110 is shifted relative to an earlier value rather than being turned on/off. Shifting the light quality relative to an earlier value in one direction may be interpreted as a binary "1" and shifting the light quality relative to an earlier value in the opposite direction may be interpreted as a binary "0". In other implementations, the light output by the LCom-enabled luminaire 110 is output having properties that represent absolute values, either by varying light intensity, hue, or both.

Figure 10:
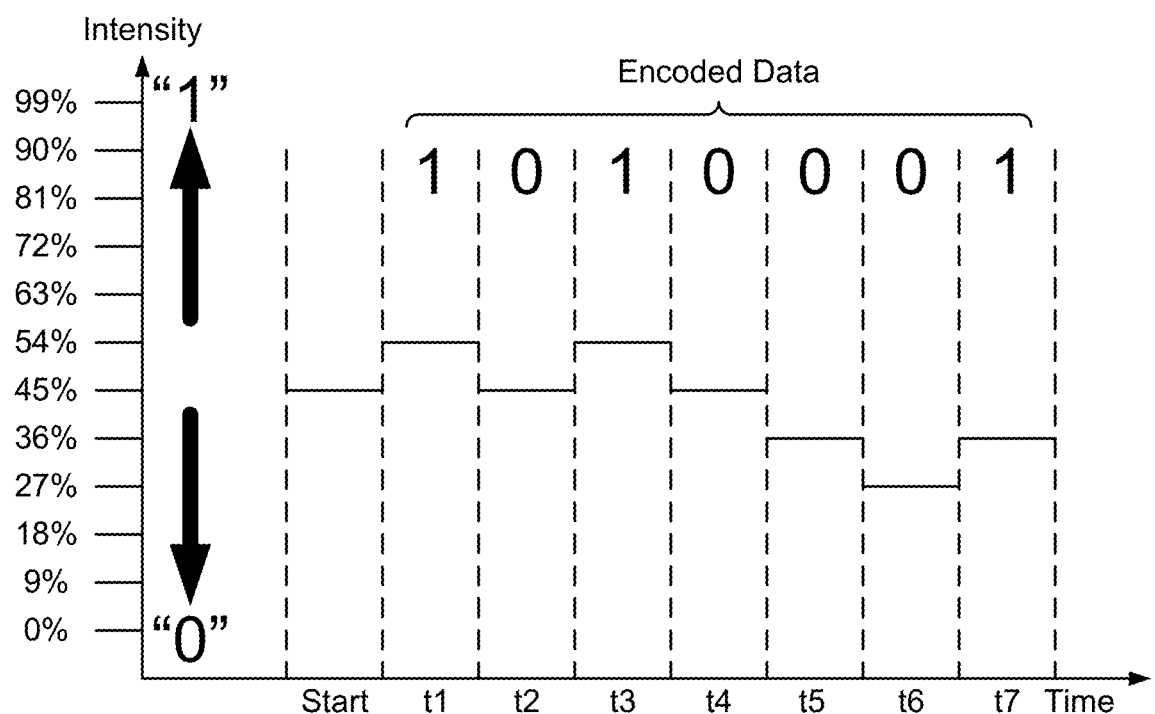
FIGS. 10-11 illustrate example relative intensity processes for encoding data onto a light-based communication signal by an LCom-enabled luminaire in accordance with some embodiments of the present disclosure.

In some embodiments, for example, as shown in FIG. 10, the intensity of the light is varied relative to an earlier value to encode data into the light output from the LCom-enabled luminaire 110. Specifically, in the implementation shown in FIG. 10, the intensity of the light output by the LCom-enabled luminaire 110 is graduated into 12 graduation levels. In some embodiments, movement from a lower intensity graduation to a higher intensity graduation encodes a binary "1" while movement from a higher intensity graduation to a lower intensity graduation encodes a binary "0". In other embodiments this may be reversed such that movement from a lower intensity graduation to a higher intensity graduation encodes a binary "0" while movement from a higher intensity graduation to a lower intensity graduation encodes a binary "1".

In the sequence of light levels shown in FIG. 10, the image capture device detects an increase in intensity of light during time t1 than it previously captured in an earlier point in time. Accordingly, the signal obtained from the image captured at time t1 is a binary "1". At time t2, the intensity of light detected by the image capture device is lower than the intensity of light captured at time t1. Accordingly, the signal obtained from the image captured at time t2 is a binary "0". Based on the relative variation in light levels over time displayed in FIG. 10, the relative variation encodes a signal "1010001".

There are instances in which the LCom signal 130 may encode a relatively long sequence of 0s or 1s. In one implementation, since there are a finite number of light levels in the graduated intensity scale, maintaining light at the same light intensity level during a subsequent time interval is interpreted as the same value as the previously detected value. For example, if the most recent relative variation was an increase in intensity that encoded a binary "1", maintaining the light intensity at the same value over subsequent time intervals would be interpreted as also encoding binary "1"s for each of the subsequent time intervals. Similarly, if the most recent relative variation was a decrease in intensity that encoded a binary "0", maintaining the light intensity at the same value over subsequent time intervals would be interpreted as also encoding binary "0"s for each of the subsequent time intervals.

Figure 11:
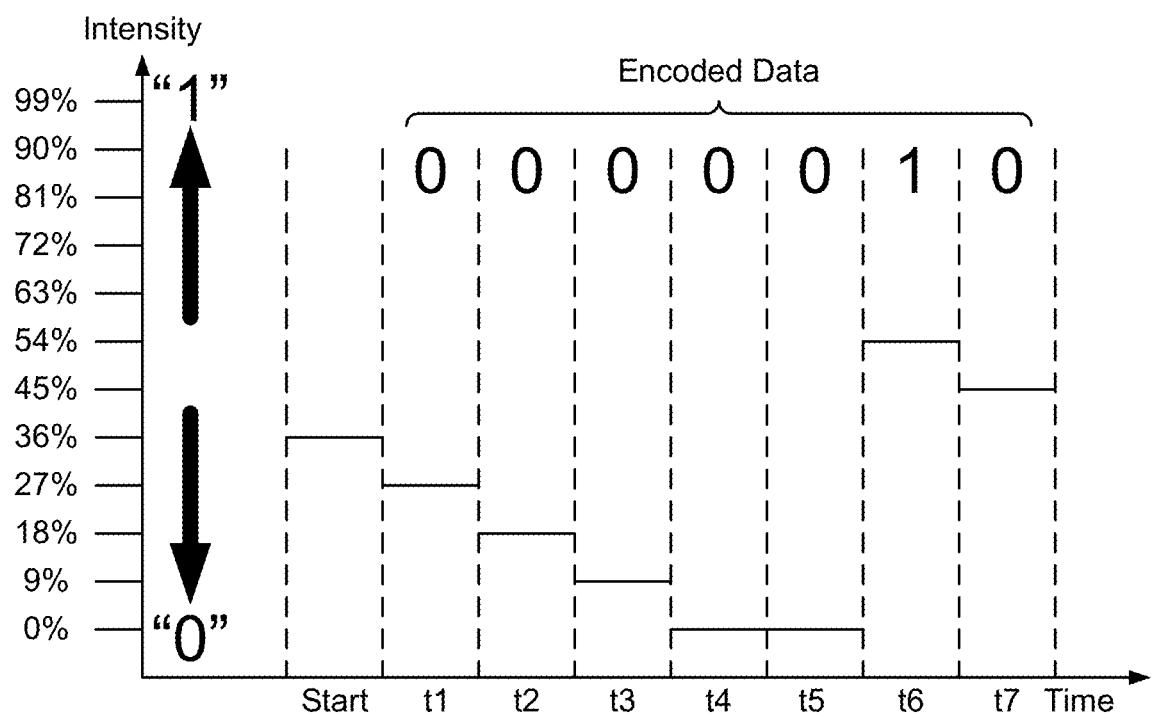

Maintaining time synchronization between the LCom and the computing device 120 is more difficult when the intensity of the output light is not changing. In another implementation, as shown in FIG. 11, encoding a string of "0"s or "1"s may be done by initially varying the intensity level during each subsequent time interval. If the intensity of the light reaches the end of the intensity scale, the intensity may be held at the intensity level over subsequent time intervals until the next binary number change. For example, as shown in FIG. 11, during time intervals 1-4 the relative intensity of the light output from the LCom-enabled luminaire is reduced until the intensity is at 0%. At that point the light output from the LCom-enabled luminaire continues to be output at 0% to encode the value "0" during subsequent time interval t5.

At time interval t6, the light intensity is increased to encode a "1". In the example shown in FIG. 11 the light intensity is brought back to close to the middle intensity to enable a larger range of light values to be available for encoding above and below the intensity value at time t6. Although there was a large intensity gain at time t6, the relative difference between time t5 and time t6 is used to determine a "0" or "1", so the fact that the intensity increased significantly does not affect the binary signal detected from the received light.

The LCom-enabled luminaire 110, in one implementation, is able to look at an upcoming string of bits to be translated to determine the magnitude of increase in any one time interval. For example, if the string of bits to be transmitted includes mainly short strings of "0"s and "1" s, the intensity increase during any one intensity change may tend to push the data toward the middle of the intensity scale. For example, a binary string of 010100110011 may be adequately encoded by using intensity jumps such as the jump shown in FIG. 11 at time t6 to jump toward the middle of the intensity scale. If the binary string contains a long string of either "1"s or "0" s, the intensity jump prior to the long string may tend toward the opposite end of the intensity spectrum to enable larger numbers of bits to be encoded through sequential intensity changes. For example, if the LCom-enabled luminaire is to encode the binary string 1000000010, the intensity jump to encode the initial 1 may cause the intensity to be output at 90%, so that the subsequent 7 "0"s may each be encoded using a relative reduction in intensity over the next subsequent time intervals without causing the intensity to be reduced to 0%.

FIGS. 12-13 show another implementation in which relative color changes (hue) are used to encode binary information on an LCom signal. As shown in FIG. 12, in one implementation a 12 color wheel 1200 is used to define relative color hues. Change in color of the light output by an LCom-enabled luminaire is interpreted as a binary "0" if the color change is in a counter-clockwise direction on the color wheel, and is interpreted as a binary "1" if the color change is in a clockwise direction on the color wheel. Of course the two directions may be reversed such that a clockwise color change is interpreted as a binary "0" and a counterclockwise color change is interpreted as a binary "1". Likewise although implementations have been described in which the color wheel has 12 colors, other numbers of colors may be used as well.

FIG. 13 shows an example binary sequence encoded using relative color changes. As shown in FIG. 13, in this example the initial light hue is yellow (Y). During time t1 the light detected by the image capture device 370 is Yellow-Green (Y-G). A color shift from Yellow to Yellow-Green represents a clockwise shift on the color wheel, and accordingly is interpreted as encoding a binary "1". During time t2 the light detected by the image capture device 370 is Yellow (Y). A color shift from Yellow-Green to Yellow represents a counter-clockwise shift on the color wheel, and accordingly may be interpreted as encoding a binary "0". During subsequent time periods, the image capture device 370 detects the following relative hue changes:

t3—a change from Yellow (Y) to Yellow-Green (Y-G), encoding binary "1".

t4—a change from Yellow-Green (Y-G) to Yellow (Y), encoding binary "0".

t5—a change from Yellow (Y) to Orange-Yellow (O-Y), encoding binary "0".

t6—a change from Orange-Yellow (O-Y) to Orange (O), encoding binary "0".

t7—a change from Orange (O) to Orange-Yellow (O-Y), encoding binary "1".

Because the color wheel is circular, relative color changes may be used to encode indefinitely long strings of binary "0"s or "1"s without encountering issues described above when using intensity levels to encode long strings of binary "0"s and "1" s.

When relative light intensity changes and/or hue values are used to encode binary data, the amount of data that may be transmitted may be limited. Specifically, the image capture device 370 may be able to obtain at most one bit from each one or two frames. However, there is no requirement that the LCom-enabled luminaire and the computing device 120 be synchronized/calibrated. Rather, because the computing device may be simply detecting changes in intensity and/or changes in hue, the computing device does not need to know that the LCom-enabled luminaire may be transmitting at 72% intensity rather than 63% intensity. When relative changes are used to encode data, the relative change in intensity may be relevant and the absolute value of the received light may not be relevant to extracting data from the LCom signals.

Figure 14:
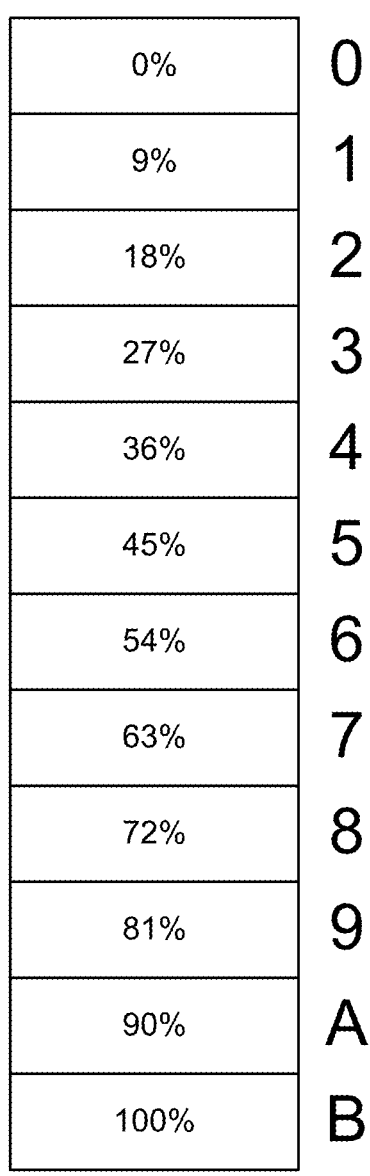
FIG. 14 illustrates an example absolute intensity process for encoding data onto a light-based communication signal by an LCom-enabled luminaire in accordance with some embodiments of the present disclosure.
Figure 15:
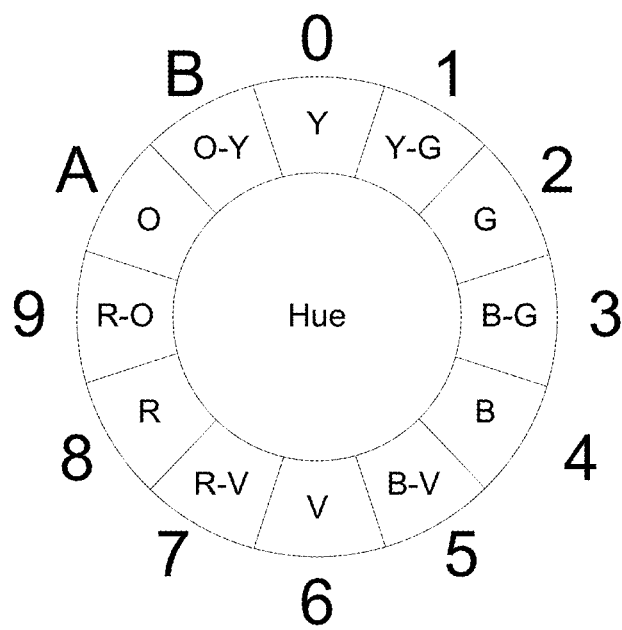
FIG. 15 illustrates an example absolute hue process for encoding data onto a light-based communication signal by an LCom-enabled luminaire in accordance with some embodiments of the present disclosure.

In another implementation, as shown in FIGS. 14-15, absolute values of intensity and/or hue may be used to encode data on the LCom signals 130. For example, as shown in FIG. 14, light intensity output by the LCom-enabled luminaire 110 may be divided into 12 intensity levels ranging from 0% to 100%. Each of the intensity levels may be assigned a value, labeled 0-9, A and B in FIG. 14. LCom signals 130 in an absolute transmission scheme are encoded by causing the LCom-enabled luminaire 110 to output light having one of the specified intensity levels corresponding to the value to be transmitted. Thus, in an absolute encoding scheme, during each image capture interval the image capture device 370 receives a piece of data with 12 possible values. Over a sequence of frames, the number of combinations of data becomes quite large, thus accelerating the transmission of data between the LCom-enabled luminaire 110 and the computing device 120.

For example, in an example encoding process, the image capture device 370 captures LCom signals 130 encoded by an LCom-enabled luminaire 110. To enable the LCom-enabled luminaire 110 and the computing device 120 to be synchronized, the first two bits of the transmission in some embodiments are used to transmit calibration information. For example, in embodiments in which an absolute intensity is being used to transmit LCom signals 130, the first calibration bit may be transmitted by causing the LCom-enabled luminaire to output light at 100% and the second calibration bit may be transmitted by causing the LCom-enabled luminaire to output light at 50%. Other intensity values may likewise be used for calibration. The computing device 120 receives these values and uses the calibration values to adjust the absolute intensity scale it uses to interpret the LCom signals 130. If the first two bits of the encoding stream are used for calibration, and the next seven bits are used to transmit data using an intensity scale with 12 intensity levels, the seven data bits will encode 12' different values, or on the order of approximately 36 million different values. Optionally a parity bit is added at the end of the transmission sequence. In some embodiments the LCom data is transmitted multiple times in a sequence to ensure accurate transmission of the LCom data from the LCom-enabled luminaire 110 to the computing device 120.

As shown in FIG. 15, the absolute value of the hue of the light output by the LCom-enabled luminaire 110 may likewise be used to encode data on the LCom signals 130. For example, in some embodiments as shown in FIG. 15, light output by the LCom-enabled luminaire 110 may be divided into 12 hues. Each hue is assigned a value, labeled 0-9, A and B in FIG. 15. Although the hues are assigned values in numerical order around the color wheel in FIG. 15, any value may be assigned to any hue depending on the implementation. LCom signals 130 in an absolute transmission scheme are encoded by causing the LCom-enabled luminaire 110 to output light having one of the specified hues corresponding to the value to be transmitted. Thus, in an absolute encoding scheme, during each image capture interval the image capture device 370 receives a piece of data with 12 possible values. Over a sequence of frames, the number of combinations of data becomes quite large thus accelerating the transmission of data between the LCom-enabled luminaire 110 and the computing device 120.

For example, in an example encoding process, the image capture device 370 may be capturing LCom signals 130 encoded by an LCom-enabled luminaire. To enable the LCom-enabled luminaire 110 and the computing device 120 to be synchronized, the first two bits of the transmission in some embodiments are used to transmit calibration information. For example, where absolute hue is used to transmit LCom signals 130, the first calibration bit may be transmitted by causing the LCom-enabled luminaire to output yellow light (hue 0), and the second calibration bit may be transmitted by causing the LCom-enabled luminaire to output Violet light (hue 6). Other hue values may likewise be used for calibration. The computing device 120 receives these values and uses the calibration values to adjust the absolute hue scale it uses to interpret the LCom signals 130. If the first two bits of the encoding stream are used for calibration in which the LCom-enabled luminaire 110, and the next seven bits are used to transmit data using a hue scale with 12 different hues, the seven data bits will encode 12' different values, or on the order of approximately 36 million different values. Optionally a parity bit may be added at the end of the transmission sequence. In some embodiments the LCom data is transmitted multiple times in a sequence to ensure accurate transmission of the LCom data from the LCom-enabled luminaire 110 to the computing device 120.

FIG. 16 is a flow chart of an example method of light-based communication using camera frame-rate based light modulation. The method may be performed by a light-based communication system that includes one or more LCom-enabled luminaires (e.g., LCom-enabled luminaire 110) and a computing device (e.g., computing device 120). As shown in FIG. 16, in block 1600 commissioning of one or more luminaires is initiated. In one implementation, commissioning of LCom-enabled luminaire 110 is initiated by contacting the LCom-enabled luminaire 110. In one embodiment, a user may contact the LCom-enabled luminaire by pressing a commissioning initialization button 290 (see FIG. 2) on the LCom-enabled luminaire 110. In another implementation, initialization of commissioning is caused by having gateway 150 transmit a signal to all non-commissioned LCom-enabled luminaires 110 to instruct the non-commissioned LCom-enabled luminaires 110 to begin the commissioning routine. In another implementation, computing device 120 may identify itself to gateway 150 and specify its location, and instruct gateway 150 to send a signal to all non-commissioned LCom-enabled luminaires 110 in a vicinity of the computing device 120. Identification of non-commissioned LCom-enabled luminaires 110 in the vicinity of the computing device may be determined when the gateway has positional information such as GPS coordinates of the LCom-enabled luminaires 110.

In some implementations, initialization of commissioning is implemented by transmission of signals from the computing device 120 to the LCom-enabled luminaire. Transmission of signals from the computing device 120 to the LCom-enabled luminaire may utilize one or more wireless communication protocols, such as Wi-Fi, Bluetooth, or a another wireless communication protocol. Transmission of signals from the computing device 120 to the LCom-enabled luminaire may also be implemented using optical communication mechanisms, such as by activation of light source 397 on computing device 120 to transmit a light-based pattern received by LCom-enabled luminaire 110 at light receptor 295 and interpreted by LCom-enabled luminaire 110 as an instruction to initiate the commissioning process. In another implementation contacting LCom-enabled luminaire 110 is implemented by turning on/off power to the LCom-enabled luminaire 110 in a particular pattern.

As shown in block 1610, a luminaire initiates the commissioning routine by adjusting light output to notify a user of computing device 120 that commissioning has begun. In one implementation, the light output by the LCom-enabled luminaire 110 may be turned on/off or otherwise pulsed to alert the user to start the commissioning application. In another implementation, the gateway 150 alerts computing device 120 by transmission of signals on network 140 to cause application 240 to start on computing device 120. In another implementation, the LCom-enabled luminaire 110 outputs pulsed light that is received by an image capture device 370 or a light sensor 395 on computing device 120 to alert computing device 120 that LCom signals will be transmitted. Transmission of light signals to the image capture device 370 or the light sensor 395 may be used, for example, to synchronize timing between LCom-enabled luminaire 110 and computing device 120.

As shown in block 1620, a determination is then made as to whether absolute LCom-encoding or relative LCom-encoding is being used. Which LCom encoding scheme is used may be based on how the LCom-enabled luminaire is configured (e.g., configured for absolute LCom-encoding), or may be chosen by a user (e.g., through an application 240 on the computing device 120). As shown in block 1630, if absolute LCom-encoding is being used, the LCom-enabled luminaire 130 outputs light having particular hue and/or particular light intensities that correspond to discrete values. As shown in block 1640, if relative LCom-encoding is being used, the LCom-enabled luminaire 130 outputs light in which changes in hue and/or light intensity relative to previous hue and/or light intensity correspond to binary values.

In another implementation both absolute and relative encoding are used. For example, in one implementation the absolute value of light intensity is used to encode discrete values while relative changes in hue are also used to transmit binary information. In another implementation, the absolute value of light hue is used to encode discrete values while relative changes in light intensity are also used to transmit binary information. By using both absolute and relative encoding, twice as much information may be transmitted during any given frame.

In yet another implementation, absolute encoding of both hue and intensity is used. For example, in one implementation the absolute value of light intensity varies between twelve discrete intensity levels. Likewise, in an implementation the absolute hue also is varied between twelve discrete hues. By combining absolute intensity and absolute hue encoding, significantly more information may be transmitted in each frame. Setting $C_I$ to be the number of absolute intensity levels in the communication protocol, and $C_H$ to be the absolute number of absolute hues in the communication protocol, the total number of values $C_T$ in the communication protocol is equal to the product of $C_I$ and $C_H$: $C_T=C_I*C_H$. Where both $C_I$ and $C_H$ are set to equal 12, it may be possible to transmit 144 discrete values during each frame. Over the course of 3 frames, it thus may be possible to transmit on the order of 3 million different values ($144^3$=2.98 M).

In yet another implementation, relative encoding of both hue and intensity is used. For example, the relative change in value of light intensity between sequential frames is used to transmit binary information and, likewise, the relative change in hue between sequential frames is used to transmit additional binary information. This enables twice as much binary information to be transmitted per frame to thus reduce the amount of time for transmission of binary information by half, while continuing to not require synchronization of calibration between the LCom-enabled luminaire 110 and the computing device 120.

At block 1650 the computing device 120 receives LCom signals 130 and extracts data from the LCom signals. In the example process of FIG. 16, the LCom-enabled luminaire is performing a commissioning process and, in one implementation, performing of a commissioning process entails transmission of an LCom-enabled luminaire ID from the LCom-enabled luminaire 110 to the computing device 120. Other information may be transmitted as well.

At block 1660, the computing device 120 transmits the LCom-enabled luminaire ID to the gateway 150 on network 140. Optionally, the computing device 120 may also associate a name for the LCom-enabled luminaire that may be easier for a user to remember. For example, the user may assign a name to an LCom-enabled luminaire 110, e.g. "office light", so that the user may use the label to identify the LCom-enabled luminaire 110 during a subsequent control operation. Additionally, the computing device 120 may also optionally transmit a geographic or geospatial position of the LCom-enabled luminaire 130.

At block 1670, the gateway 150 associates the LCom-enabled luminaire ID transmitted during the commissioning process with the gateway identifier of the LCom-enabled luminaire. The gateway optionally may verify the association between the LCom-enabled luminaire ID and LCom-enabled luminaire position by turning the LCom-enabled luminaire off, on, or otherwise briefly adjusting operation of the LCom-enabled luminaire. Alternatively, the gateway may instruct the now commissioned LCom-enabled luminaire to transmit a verification code via LCom signals 130 to the computing device 120 to verify to the computing device 120 that the commissioning process was successful.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Read Only Memory (ROM), cache, optical or magnetic disk, Redundant Array of Independent Disks (RAID), floppy drive, CD, DVD, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), personal digital assistant(s) (PDA(s)), handheld device(s) such as cellular telephone(s) or smart cellphone(s), laptop(s), tablet or handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Implementations of the systems and methods described above include computer components and computer-implemented processes that will be apparent to those skilled in the art. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

The following reference numerals are used in the drawings:

100 Light-based Communication (LCom) system
110 LCom-enabled luminaire
120 computing device
130 LCom signals
140 Network
150 Gateway
200 solid-state light source
210 driver
220 memory
230 processor
240 application
250 controller
260 communication bus/interconnect
270 communication module
280 modulator
290 commissioning initialization button
295 light receptor
300 memory
310 processor
320 Operating System
330 User Interface
340 application
350 display
355 communication bus/interconnect
360 communication module
370 image capture device
380 front facing camera
390 rear facing camera
395 light sensor
397 light source
410 image
710 image
720 right side of display
730 image
740 left side of display
1200 color wheel Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A method of Light-based Communication (LCom) using camera frame-rate based light modulation, the method comprising:
    determining, by a computing device, an encoding scheme used by one or more LCom-enabled luminaires to transmit data to the computing device via modulated light, wherein the encoding scheme comprises at least one of encoding data as absolute values of a light intensity level of light and encoding data as absolute values of a light hue of the light;
    transmitting, by the computing device, a synchronization command to the one or more LCom-enabled luminaires, wherein the synchronization command synchronizes at least one parameter of a global shutter image capture process;
    receiving, at the computing device from the one or more LCom-enabled luminaires using the determined encoding scheme, modulated light having light properties that vary at a first frequency using the global shutter image capture process of an image capture device on the computing device;
    comparing, by the computing device, light properties received by the image capture device over sequential image capture instances; and
    determining, by the computing device, data encoded by the modulated light based on the compared light properties over the sequential image capture instances.

2. The method of claim 1, wherein the global shutter image capture process comprises reading all pixels of an optical sensor of the image capture device during each sequential image capture instance.

3. The method of claim 1, wherein the first frequency is at most one half a second frequency at which the image capture device performs the global shutter image capture process.

4. The method of claim 1, wherein
    the data encoded by the modulated light comprises a first stream of data encoded as absolute values of the light hue of the light, and a second stream of data encoded as absolute values of the light intensity level of the light.

5. The method of claim 1, the method further comprising contacting the one or more LCom-enabled luminaires to initiate transmission of the modulated light by one of:
    pushing a button on each of the one or more LCom-enabled luminaires;

transmitting optical signals from the computing device to the one or more LCom-enabled luminaires;

transmitting wireless control signals to the one or more LCom-enabled luminaires, the wireless control signals comprising one of Wi-Fi signals and Bluetooth signals; and turning on and off a power to the one or more LCom-enabled luminaires one or more times.

6. A computing device, comprising:

an image capture device configured to receive using a global shutter image capture process, from one or more LCom-enabled luminaires, light modulated according to an encoding scheme, wherein the light has light properties that vary at a first frequency; and a processor coupled to the image capture device and configured to:

determine the encoding scheme used by the one or more LCom-enabled luminaires to transmit data to the computing device, wherein the encoding scheme comprises at least one of encoding data as absolute values of a light intensity level of light and encoding data as absolute values of a light hue of the light;

transmit a synchronization command to the one or more LCom-enabled luminaires, wherein the synchronization command synchronizes at least one parameter of the global shutter image capture process;

compare light properties received by the image capture device over sequential image capture instances; and determine data encoded by the modulated light based on the compared light properties over the sequential image capture instances.

7. The computing device of claim 6, wherein the global shutter image capture process comprises reading all pixels of an optical sensor of the image capture device during each sequential image capture instance.

8. The computing device of claim 6, wherein the first frequency is at most one half a second frequency at which the image capture device performs the global shutter image capture process.

9. The computing device of claim 6, wherein:

the data encoded by the modulated light comprises a first stream of data encoded as absolute values of the light hue of the light, and a second stream of data encoded as absolute values of the light intensity level of the light.

10. The computing device of claim 6, wherein the processor is further configured to contact the one or more LCom-enabled luminaires to initiate transmission of the modulated light by one of:

pushing a button on each of the one or more LCom-enabled luminaires;

transmitting optical signals from the computing device to the one or more LCom-enabled luminaires;

transmitting wireless control signals to the one or more LCom-enabled luminaires, the wireless control signals comprising one of Wi-Fi signals and Bluetooth signals; and turning on and off a power to the one or more LCom-enabled luminaires one or more times.

11. A lighting system, comprising:

a LCom-enabled luminaire having a solid-state light source configured to encode data according to an encoding scheme by emitting modulated light having light properties that vary at a first frequency, and a computing device, comprising:

an image capture device configured to receive, from the LCom-enabled luminaire, the modulated light using a global shutter image capture process; and a processor coupled to the image capture device and configured to:

determine the encoding scheme used by the LCom-enabled luminaire, wherein the encoding scheme comprises at least one of encoding data as absolute values of a light intensity level of light and encoding data as absolute values of a light hue of the light;

transmit a synchronization command to the LCom-enabled luminaire, wherein the synchronization command synchronizes at least one parameter of the global shutter image capture process;

compare light properties received by the image capture device over sequential image capture instances; and determine data encoded by the modulated light based on the compared light properties over the sequential image capture instances.

12. The lighting system of claim 11, wherein the global shutter image capture process comprises reading all pixels of an optical sensor of the image capture device during each sequential image capture instance.

13. The lighting system of claim 11, wherein the first frequency is at most one half a second frequency at which the image capture device performs the global shutter image capture process.

14. The method of claim 1, wherein the at least one parameter comprises at least one of the first frequency and timing.

15. The method of claim 1, wherein the computing device transmits the synchronization command via a light source configured to output LCom signals to the one or more LCom-enabled luminaires.

16. The computing device of claim 6, wherein the at least one parameter comprises at least one of the first frequency and timing.

17. The computing device of claim 6, further comprising a light source configured to transmit the synchronization command to the one or more LCom-enabled luminaires via LCom signals.

18. The lighting system of claim 11, wherein the at least one parameter comprises at least one of the first frequency and timing.

19. The lighting system of claim 11, wherein the computing device further comprises a light source configured to transmit the synchronization command to the LCom-enabled luminaire via LCom signals.

* * * * *